United States Patent [19]

Nakamura

[11] Patent Number: 5,752,476

[45] Date of Patent: May 19, 1998

[54] EXHAUST CONTROLLER FOR TWO-STROKE-CYCLE ENGINE

[75] Inventor: Kazuhito Nakamura, Hamamatsu, Japan

[73] Assignee: Suzuki Kabushiki Kaisha, Hamamatsu, Japan

[21] Appl. No.: 832,778

[22] Filed: Apr. 4, 1997

[30] Foreign Application Priority Data

Aug. 26, 1996 [JP] Japan ................. 8-223360

[51] Int. Cl.$^6$ ......................................... F02D 9/06
[52] U.S. Cl. ......................................... 123/65 PE
[58] Field of Search .................. 123/65 PE, 65 EM, 123/65 P

[56] References Cited

U.S. PATENT DOCUMENTS

| | | | |
|---|---|---|---|
| 4,399,788 | 8/1983 | Bostelmann | 123/65 PE |
| 4,998,512 | 3/1991 | Masuda et al. | 123/65 PE |
| 5,220,890 | 6/1993 | Koriyama | 123/65 PE |
| 5,588,402 | 12/1996 | Lawrence | 123/65 PE |

FOREIGN PATENT DOCUMENTS 405133230  5/1993  Japan ................. 123/65 PE

*Primary Examiner*—Marguerite McMahon
*Attorney, Agent, or Firm*—Finnegan, Henderson, Farabow, Garrett & Dunner, L.L.P.

[57] ABSTRACT

A two-stroke-cycle engine is provided with a main exhaust port and a pair of auxiliary exhaust ports and includes a main exhaust valve unit slidably disposed to the main exhaust port for controlling an upper edge position of the main exhaust port and a pair of right and left auxiliary exhaust valve units disposed rotatably for opening and closing right and left auxiliary exhaust passages formed to right and left sides of a main exhaust passage formed to the engine. An exhaust controller of the engine is characterized in that a driving unit is connected to the main exhaust valve unit and the right and left auxiliary exhaust valve units are coupled with an end of the main exhaust valve unit on the main exhaust port side through a coupling pin so as to be operatively associated with the main exhaust valve unit, the right and left auxiliary exhaust valve units being disposed symmetrically with respect to the main exhaust valve unit.

8 Claims, 14 Drawing Sheets

EXHAUST CONTROLLER FOR TWO-STROKE-CYCLE ENGINE

BACKGROUND OF THE INVENTION

The present invention relates to an exhaust controller for a two-stroke-cycle engine of, for example, a motorcycle.

A first example of an exhaust controller for a two-stroke-cycle engine is shown in FIG. 12 and FIG. 13. The shown exhaust controller is arranged such that the exhaust timing of a main exhaust port 101 is switched by an centrifugal governor 100 and, at the same time, auxiliary exhaust passages 102 and a resonator chamber 103 are opened and closed. As shown in FIG. 12A and FIG. 12B, the exhaust timing is delayed by lowering a flap valve 104 in an engine low-speed rotation period as well as the resonator chamber 103 is opened by rotational valves 105 to cause the exhaust timing and the exhaust passages to cope with the engine rotating at a low speed.

On the other hand, as shown in FIG. 13A and FIG. 13B, the exhaust timing is hastened by raising the flap valve 104 while the resonator chamber 103 is closed by the rotational valves 105 to cause the chamber to communicate with the auxiliary exhaust passages 102 to cope with the engine rotating at a high speed.

The flap valve 104 is rotatably mounted to a cylinder 107 at the rear end thereof by a pin 106 and accommodated in a recess 109 formed to the upper portion of a main exhaust passage 108 so that it is free to get out of and get in to the recess 109. The rotational valves 105 are disposed on both the right and left sides of the flap valve 104 and a link mechanism 113 associated with the centrifugal governor 100 is connected to the rotational valve 105 disposed on one side thereof through a rack 110, a pinion shaft 111 and a drive shaft 112. According to this arrangement, a driving force transmitted from the link mechanism 113 to the rotational valve 105 actuates the flap valve 104 through a pinion 116. In accordance with the above power transmission passage, formed to the rotational valve 105 on the one side is a recess 115 against which a stopper valve 114 abuts to regulate the rotational range of the rotational valve 105.

One example of an exhaust controller is disclosed in Japanese Patent Laid-open Publication No. SHO 63-173817 as an example relating to the first example of the above prior art, in which the exhaust controller is arranged such that right and left rotational valves are independently driven by a rack and pinion and a flap valve is rotated by the driving forces from the right and left sides produced by these rotational valves.

Next, a second example of a conventional exhaust controller will be described hereunder with reference to FIG. 14, in which the exhaust controller is arranged such that two slide valves 117a and 117b are slidably accommodated above an exhaust passage and caused to slidably get in to and out of an exhaust port of an engine to achieve two stages of an exhaust timing. According to this controller, as the number of engine rotation increases, the lower slide valve 117a is first raised to hasten the exhaust timing and the slide valve 117a is then raised in an engine high-speed rotation period to thereby pull the upper slide valve 117b engaged therewith through a pin 118 so that the exhaust timing copes with the engine rotating at a high speed. A fixed plate 119 is disposed on the upper surface of the upper slide valve 117b for forming an exhaust port upper edge when the exhaust timing is fastest (when both the two slide valves 117a and 117b are raised together), and a control spring 120 is accommodated in the fixed plate 119 to control the number of engine rotation at which the upper slide valve 117b is actuated.

Japanese Patent Laid-open Publication No. HEI 5-256139 discloses an exhaust timing controller relating to the second example of the prior art. In this exhaust timing controller, the rear end of the lower slide valve is linked to the right and left rotational valves externally of a cylinder.

However, the above conventional exhaust controllers provide the following problems.

In the first example, since the flap valve 104 is actuated by driving the rotational valve 105 on the one side and the right and left rotational valves are differently arranged in shape due to the formation of the recess 115, the driving force is applied to the flap valve 104 in a biased state. Thus, there is a possibility that the flap valve 104 is adversely actuated because it is inclined. Since the right and left rotational valves 105 have different shapes, many kinds of parts are needed and, hence, manufacturing cost is increased. Further, the exhaust device disclosed in the Japanese Laid-open Patent Publication No. SHO 63-173817 provides a drawback that when a gear driving mechanism composed of the rack and pinion is subjected to the heat of an exhaust gas, there is a possibility of dislocation of the meshed gears by the extension of the distance between respective shafts and the like, the exhaust device lacks accuracy in control.

In the second example, since the control spring 120 of the upper slide valve 117b is accommodated in the fixed plate 119, the control spring 120 must be replaced to finely adjust the operation point of the upper slide valve 117b and ordinary users cannot simply adjust it. Since the control spring 120 is located in an exhaust gas, the use of the control spring 120 for a long time may cause a load change to it. Additionally, in the exhaust timing controller disclosed in the Japanese Patent Laid-open Publication No. HEI 5-256139, since the lower slide valve is linked to the right and left rotational valves externally of the cylinder, the structure thereof is not effective to sand, mud water and the like.

SUMMARY OF THE INVENTION

An object of the present invention is to substantially eliminate defects or drawbacks encountered in the prior art described above and to provide an exhaust controller for a two-stroke-cycle engine of, for example, a motorcycle, which enhances the actuating performance of a main exhaust valve for making an exhaust timing variable and auxiliary exhaust valves for opening and closing auxiliary exhaust passages, accurately executes exhaust control, is advantageous to sand, mud and the like, maintains the set load of a control spring as well as permits the control spring to be firely adjusted from the outside.

This and other objects can be achieved according to the present invention by providing an exhaust controller for a two-stroke-cycle engine provided with a main exhaust port and a pair of auxiliary exhaust ports and including a main exhaust valve unit slidably disposed to the main exhaust port for controlling an opening area of an upper edge position of the main exhaust port and a pair of right and left auxiliary exhaust valve units disposed rotatably for opening and closing right and left auxiliary exhaust passages formed to right and left sides of a main exhaust passage formed to the engine, the controller being characterized in that a driving unit is connected to the main exhaust valve unit, and the right and left auxiliary exhaust valve units are coupled with an end of the main exhaust valve unit on the main exhaust port side through a coupling pin so as to be operatively associated with the main exhaust valve unit, the right and left auxiliary exhaust valve units being disposed symmetrically with respect to the main exhaust valve unit.

In preferred embodiments, a valve bore is formed to the engine in which the main exhaust valve unit is disposed to be slidable. The main exhaust valve unit has a projected end portion to which is attached a coupling pin to which the driving unit is connected. The driving unit is composed of a governor means following up with a rotation of a crank shaft disposed in the engine.

Each of the auxiliary exhaust valve units is disposed in an intermediate portion of a corresponding auxiliary exhaust passage and is composed of substantially a semi-columnar portion and a shaft portion integrally formed with the semi-columnar portion. The semi-columnar portion is formed with a slot into which the coupling pin connecting the main exhaust valve unit to the auxiliary exhaust valve units is inserted so as to change a sliding motion of the main exhaust valve unit to a rotational motion of the auxiliary exhaust valve units.

The main exhaust valve unit includes a pair of upper and lower main exhaust valves piled in a vertical direction for controlling the upper edge position of the main exhaust port in two stages and the driving unit is connected to the lower main exhaust valve. A control spring for controlling an actuation of the upper main exhaust valve is incorporated in a wall portion of an element constituting a cylinder disposed in the engine and an operation member for adjusting a load of the control spring is disposed to an outside of the wall portion. The lower main exhaust valve has a rear end operatively connected to a valve arm and a front end operatively connected to the auxiliary exhaust valve units.

According to the present invention of the characters and structures described above, since the driving source is directly connected to the main exhaust valve, the actuating performance of the main exhaust valve is enhanced as compared with the arrangement in which a main exhaust valve is actuated through auxiliary exhaust valves. Since the right and left auxiliary exhaust valves are disposed at symmetrical positions across the main exhaust valve, they are actuated well by receiving substantially the same driving forces from the main exhaust valve. Further, since the right and left auxiliary exhaust valves can be formed to the same shape, the number of parts can be eliminated, and the actuating performance of the main exhaust valve can be more enhanced.

In addition, since the right and left auxiliary exhaust valves are coupled with the end of the main exhaust valve unit on the main exhaust port side through the coupling pin, the dislocated actuation which wound be caused by a gear driving mechanism does not arise as well as the arrangement is advantageous to sand, mud and the like.

Furthermore, when the main exhaust valve unit includes upper and lower main exhaust valves, since the control spring for controlling the upper main exhaust valve is incorporated in the wall portion of the cylinder constituting part, a set load can be maintained because the load is not changed by an exhaust gas. Further, since the operation member for adjusting the set load of the above control spring is disposed to the outside of the side wall of the cylinder constituting part, even ordinary users can simply carry out the fine adjustment of the control spring without decomposing the cylinder constituting part.

The nature and further characteristic features of the present invention will be made more clear from the following descriptions made with reference to the accompanying drawings.

BRIEF DESCRIPTION OF THE DRAWINGS

In the accompanying drawings:

FIGS. 2A and 2B are cross sectional views showing the state of an exhaust controller in an engine low-speed rotation period in the first embodiment, in which FIG. 2A is a view taken along a cut surface passing through a main exhaust passage and FIG. 2B is a view taken along a cut surface passing through an auxiliary exhaust passage;

FIGS. 6A and 6B are cross sectional views showing the state of the exhaust controller in an engine high-speed rotation period in the first embodiment, in which FIG. 6A is a view taken along the cut surface passing through the main exhaust passage and FIG. 6B is a view taken along the cut surface passing through the auxiliary exhaust passage;

FIGS. 7A and 7B are cross sectional views showing the state of an exhaust controller in an engine low-speed rotation period in a second embodiment, in which FIG. 7A is a view taken along a cut surface passing through a main exhaust passage and FIG. 7B is a view taken along a cut surface passing through an auxiliary exhaust passage;

FIGS. 10A and 10B are cross sectional views showing the state of the exhaust controller in engine medium-speed rotation period in the second embodiment, in which FIG. 10A is a view taken along the cut surface passing through the main exhaust passage and FIG. 10B is a view taken along the cut surface passing through the auxiliary exhaust passage;

FIGS. 11A and 11B are cross sectional views showing the state of the exhaust controller in an engine high-speed rotation period in the second embodiment, in which FIG. 11A is a view taken along the cut surface passing through the main exhaust passage and FIG. 11B is a view taken along the cut surface passing through the auxiliary exhaust passage;

FIGS. 12A and 12B are views showing the state of a first example of a conventional exhaust controller in an engine low-speed rotation period, in which FIG. 12A is a schematic view showing the controller as a whole and FIG. 12B is a cross sectional view of a cylinder;

FIGS. 13A and 13B are views showing the state of the first example of the conventional exhaust controller in an engine high-speed rotation period, in which FIG. 13A is a view showing the controller as a whole and FIG. 13B is a cross sectional view of the cylinder.

DESCRIPTION OF THE PREFERRED EMBODIMENTS

Embodiments of the present invention will be described hereunder with reference to the accompanying drawings.

Figure 1:
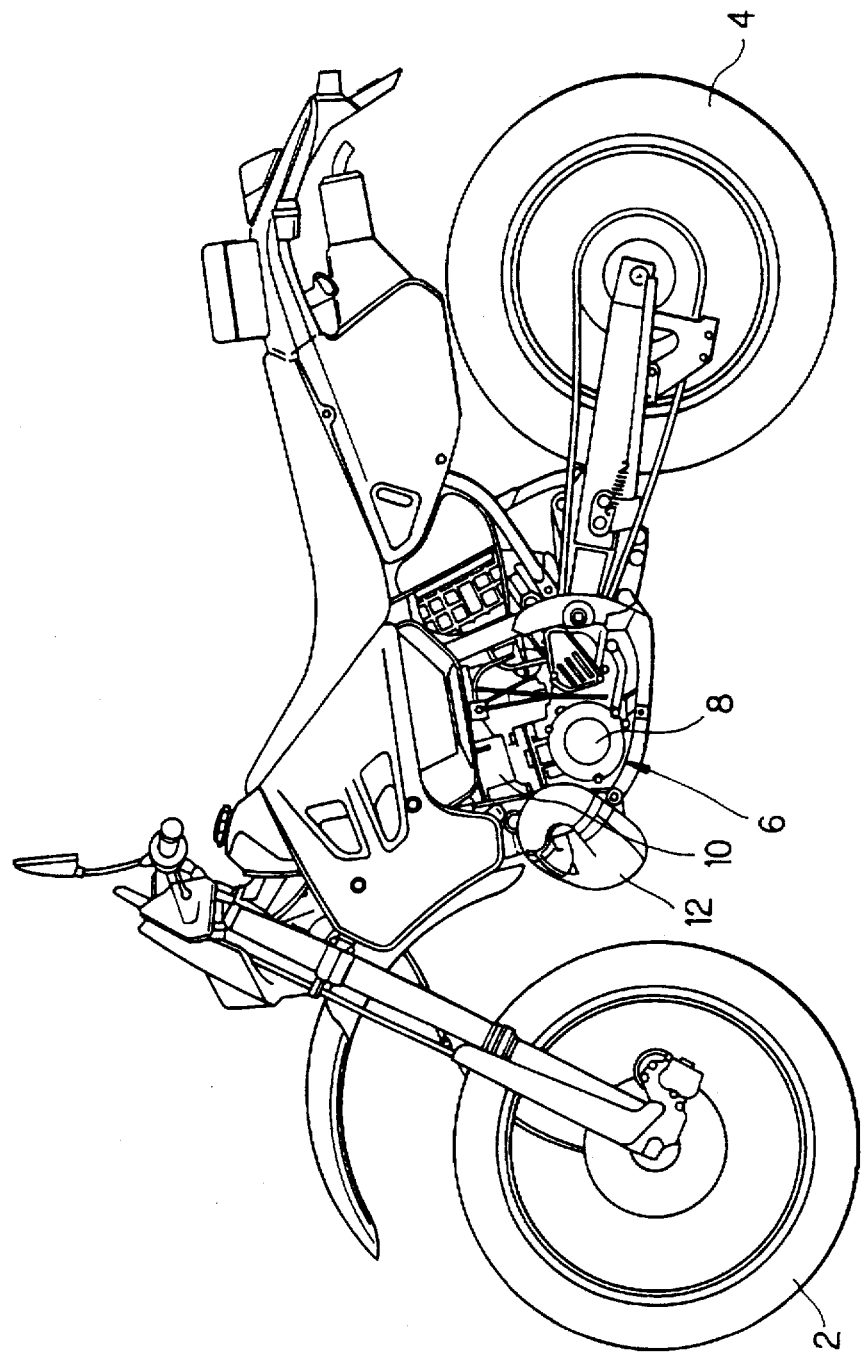
FIG. 1 is a side view of a motorcycle to which embodiments according to the present invention is applicable.

First, an exhaust controller of a first embodiment will be described. The first embodiment of an exhaust controller of the present invention is applicable to a motorcycle shown in FIG. 1, which includes a front wheel 2, a rear wheel 4 and an engine 6 interposed therebetween. The engine 6 is a two-stroke-cycle engine and includes a crank case 8 and a cylinder 10 fastened to the front upper surface of the crank case 8. An exhaust muffler 12 is connected to the front exhaust side of the cylinder 10.

Figure 2A:
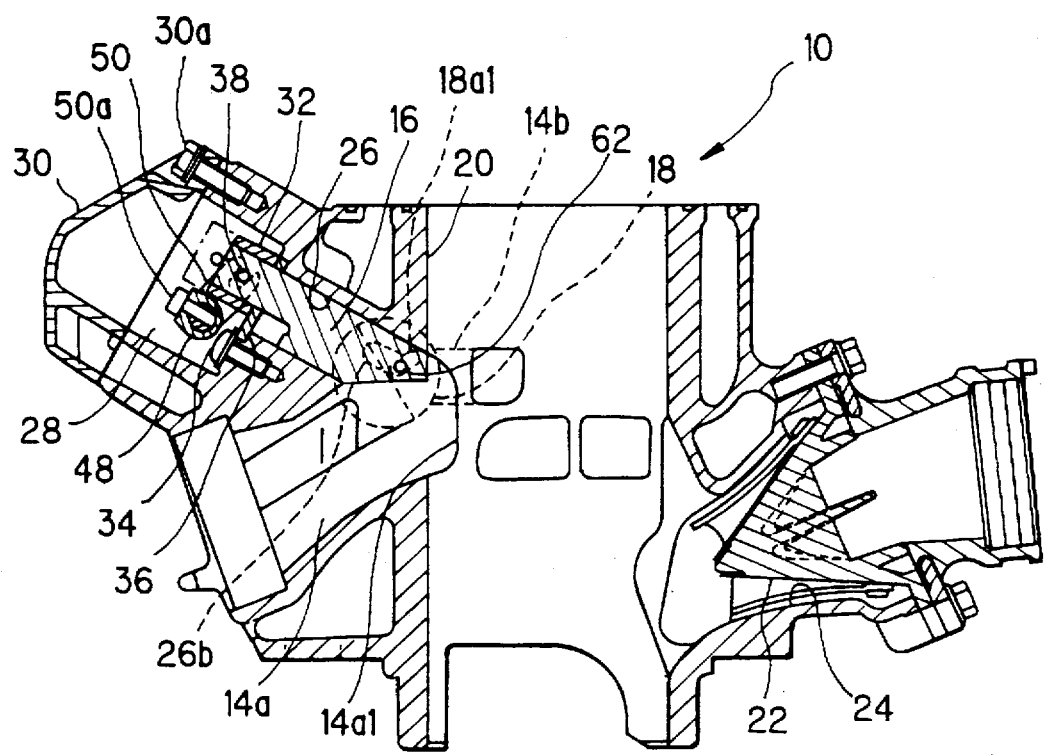
Figure 2B:
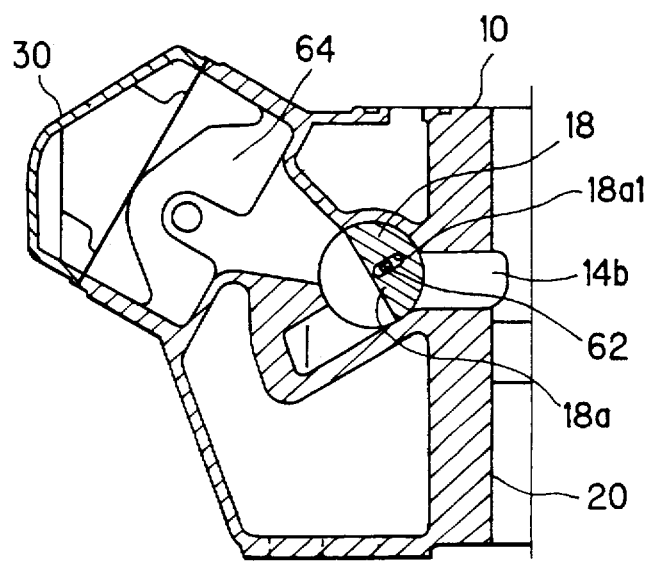

As shown in FIG. 2A and FIG. 2B, the exhaust controller includes a slide valve (corresponding to a main exhaust valve) 16 for controlling the upper edge position of a main exhaust port 14a1 disposed slidably to the main exhaust port 14a1 and right(correspond side valves (corresponding to auxiliary exhaust valves) 18 disposed rotatably so as to open and close right and left auxiliary exhaust passages 14b formed on the right and left sides of a main exhaust passage 14a.

The arrangement of the respective portions of the controller will be described.

As shown in FIG. 2A, the cylinder 10 includes a bore portion 20 having an inner surface along which a piston slides, a suction passage 24 projecting rearward of the motor cycle and having a lead valve 22 therein and the main exhaust passage 14a projecting to the forward side of the motorcycle body. The auxiliary exhaust passages 14b are symmetrically disposed on right and left sides across the main exhaust passage 14a to cause the bore portion 20 to communicate with the main exhaust passage 14a. A valve hole 26 is formed to the upper portion of the main exhaust passage 14a to accommodate the slide valve 16, and a machine chamber 28 communicating with the valve hole 26 is disposed to the opposite side of the main exhaust port 14a1 with respect to the valve hole 26. The machine chamber 28 is closed by a cover 30 fixed to the front upper portion of the cylinder 10 by means of bolt 30a.

The slide valve 16 is slidably accommodated in the valve hole 26 so that it gets in to and out of the main exhaust passage 14a. The end of the slide valve 16 on the opposite side of the main exhaust port 14a1 projects into the machine chamber 28 and a cylindrical stopper 32 fits to the projecting portion. The slide valve 16 is positioned in the state that the extreme end edge thereof coincides with the bore portion 20 in such a manner that the stopper 32 is abutted against a stopper plate 36 fastened to the rear end of the valve hole 26 by a screw 34.

Figure 3:
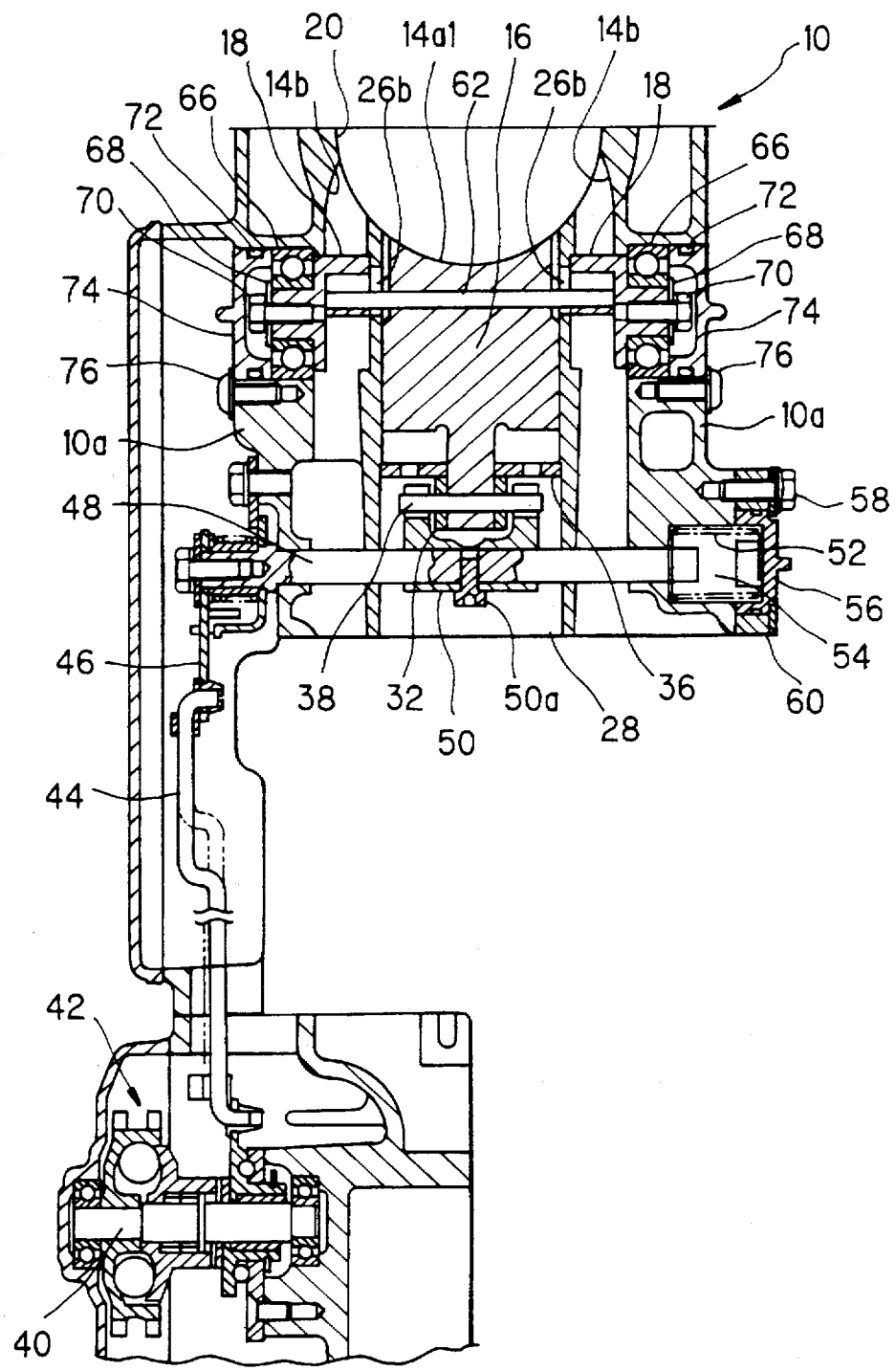
FIG. 3 is a cross sectional view schematically showing the exhaust controller of the first embodiment as a whole.
Figure 4:
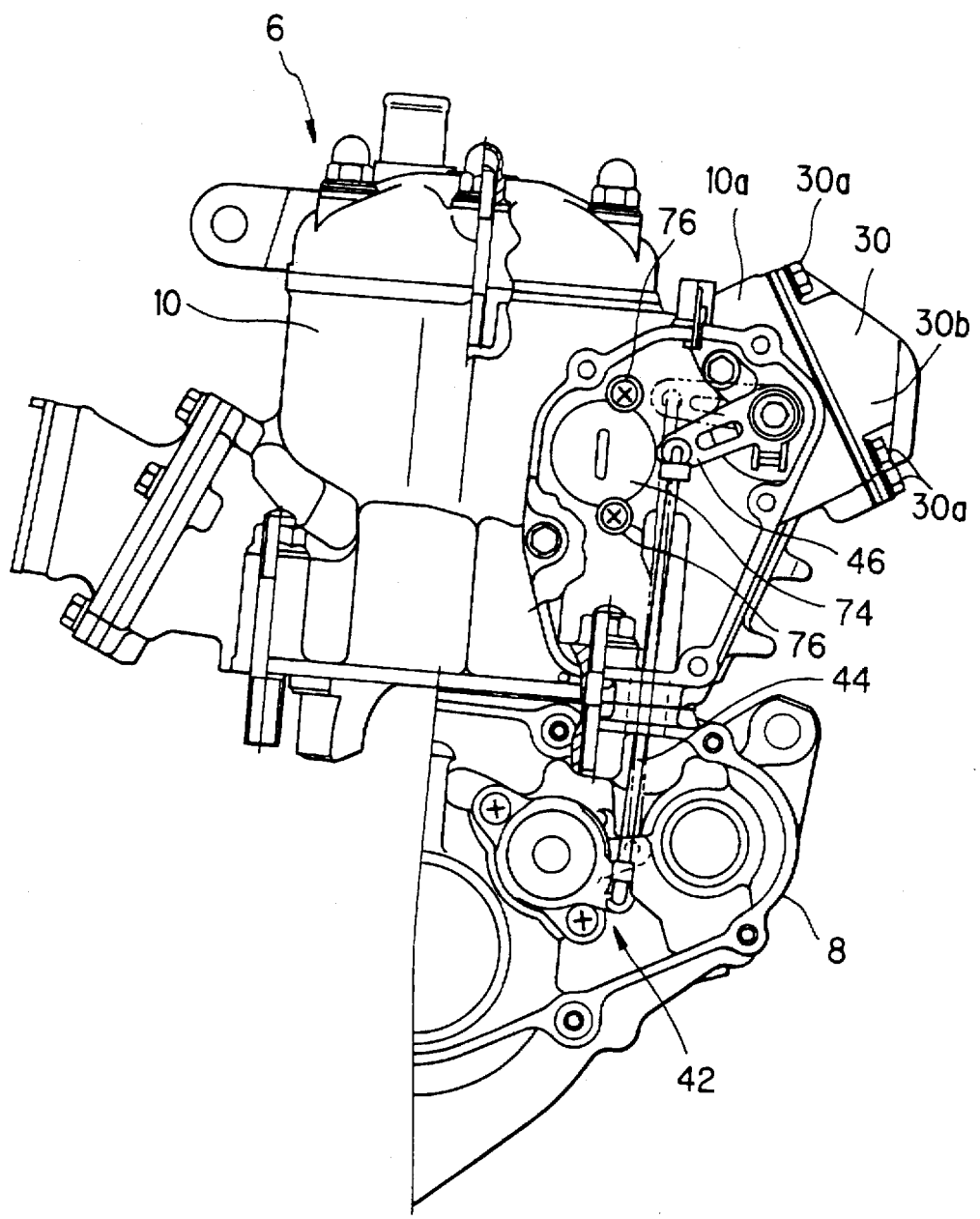
FIG. 4 is a side elevational view of an engine according to the first embodiment.

As shown in FIG. 3, a drive pin 38 is disposed to the projecting portion in a right to left direction, as viewed, so as to pass through the stopper 32, and a drive source is connected to the drive pin 38 to drive the controller. In the embodiment, the drive source of the controller is a governor shaft 40 driven by a crank shaft (not shown) and a centrifugal governor 42 fits to the governor shaft 40. The centrifugal governor 42 is connected to the drive pin 38 through a valve rod 44, a valve lever 46, a valve shaft 48 and a valve arm 50 to apply a drive force to the slide valve 16. The valve shaft 48 is rotatably supported by the right and left side walls 10a of the machine chamber 28 at both the right and left ends thereof and the valve arm 50 is fastened to the valve shaft 48 approximately at the center thereof in an axial direction by means of bolt 50a.

As shown in FIG. 3, a control spring 52 is disposed to the end of the valve shaft 48 on the opposite side of the valve lever 46 to control the actuation of the slide valve 16 by an urging force thereof in a projecting direction. The control spring 52 is accommodated in a spring chamber 54 formed to the side wall portion 10a of the machine chamber 28. An operation cap 56 is disposed to the outside of the spring chamber 54 to support the outer end of the control spring 52. Further, the outer end of the control spring 52 is locked to the inner surface of the operation cap 56. The rotation of the operation cap 56 can change the load of the control spring 52 in a twisting direction thereof, and the number of engine rotation at a time when the slide valve 16 is actuated is determined by setting the load. In addition, the operation cap 56 is fixed by a retainer 60 fixed to the side wall portion 10a of the cylinder 10 by a bolt 58 after the load of the control spring 52 is set.

As shown in FIG. 2A and FIG. 2B, the right and left side valves 18 are connected to the end of the slide valve 16 on the main exhaust port 14a1 side through a coupling pin 62 so as to associate therewith and disposed symmetrically in a right to left direction with respect to the slide valve 16, i.e. with respect to the central axis of the bore portion 20, as shown in FIG. 3.

Figure 5:
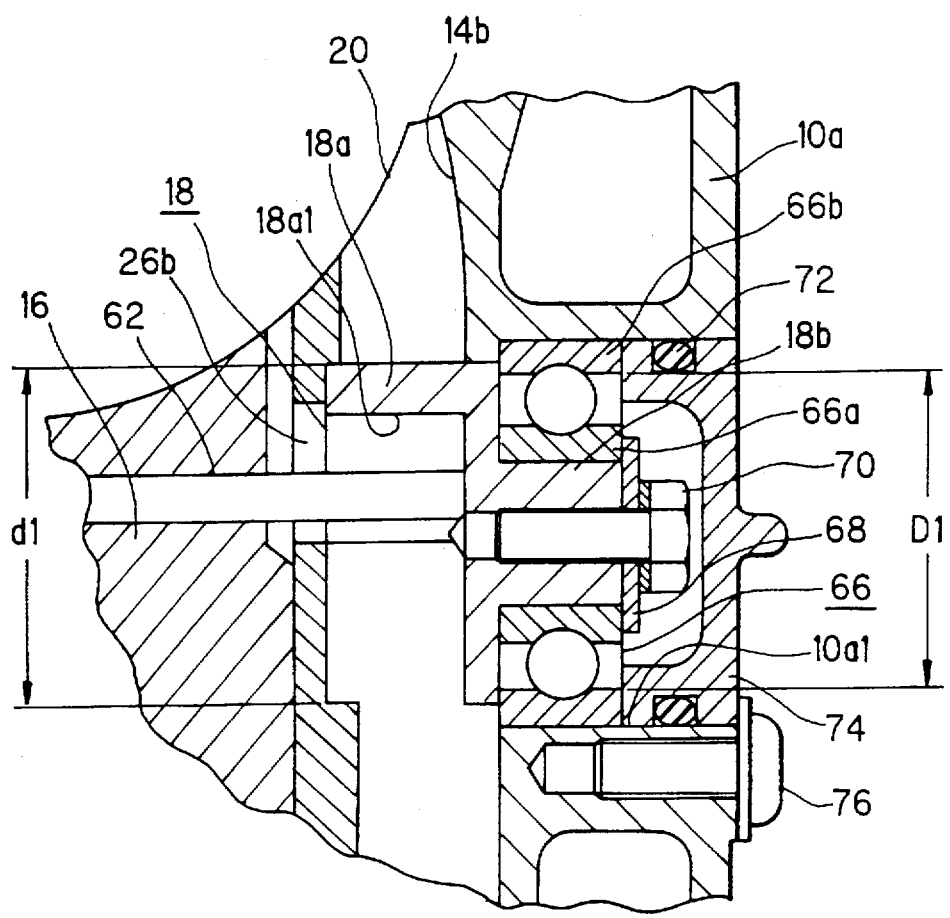
FIG. 5 is an enlarged cross sectional view of the periphery of a side valve according to the first embodiment.

As shown in FIG. 2B and FIG. 5, each of the side valves 18 is composed of an approximately semi-columnar valve portion 18a which turns at an intermediate position of the auxiliary exhaust passage 14b and opens and closes the auxiliary exhaust passage 14b and a resonator chamber 64 and a small diameter shaft portion 18b formed to the outside of the valve portion 18a integrally therewith. A slot 18a1 into which the end of the coupling pinion shaft 62 is inserted is formed at a position dislocated from the axial center of the valve portion 18a. When the slide valve 16 is slid, the coupling pin 62 moves in the slot 18a1 while guided by a guide hole 26b to thereby convert the linear motion of the slide valve 16 into the rotational motion of the side valve 18.

As shown in FIG. 5, the shaft portion 18b is rotatably supported by a shaft hole 10a1 defined to the side wall portion 10a of the cylinder 10 through a ball bearing 66 and both the right and left sides of the inner ring 66a of the ball bearing 66 are fastened by a bolt 70 in the state so as to be put between the side of the valve portion 18a and a retainer 68. In the fastened state, the side valve 18 is positioned in an axial direction by the end of the coupling pin 62 and the inner ring 66a.

In this embodiment, the outside diameter d1 of the valve portion 18a shown in FIG. 5 is set larger than the inside diameter D1 of the outer ring 66b of the ball bearing 66, for example, about 109% larger than the inside diameter D1 of the outer ring 66b, to thereby substantially close the space between the inner ring 66a and the outer ring 66b of the ball bearing 66 by the side portion of the valve portion 18a with respect to the auxiliary exhaust passages 14b. Further, the radial gap of the ball bearing 66 is set to, for example, about 40 μm or less to minimize the looseness of the side valves 18 caused by the ball bearing 66 in a possible range. A cap 74 is mounted to the outside of the ball bearing 66 in the shaft hole 10a1 through an O-ring 72 and fixed to the cylinder 10 by means of screw 76.

Operation of the exhaust controller of the first embodiment arranged as described above will be described.

First, in an engine low-speed rotation period, the slide valve 16 is most projected into the main exhaust passage 14a by the urging force of the control spring 52 as shown in FIG. 2A and FIG. 2B to thereby delay an exhaust timing by lowering the upper edge position of the main exhaust port 14a1. Further, the side valves 18 open the resonator chamber 64 and shut off the auxiliary exhaust passages 14b.

Figure 6A:
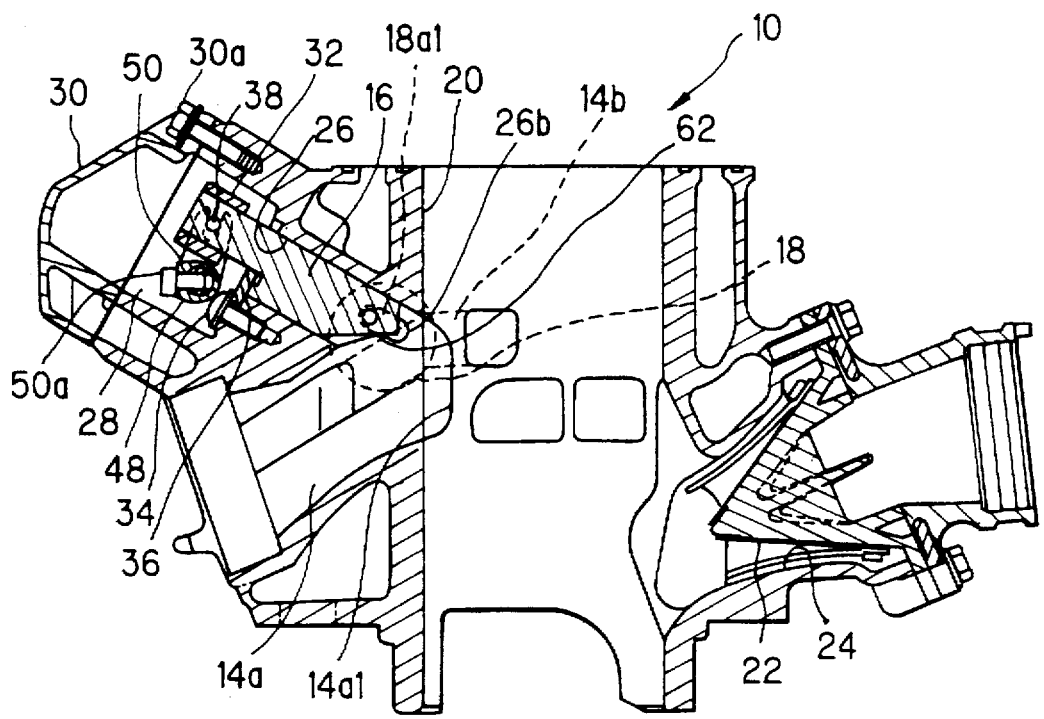
Figure 6B:
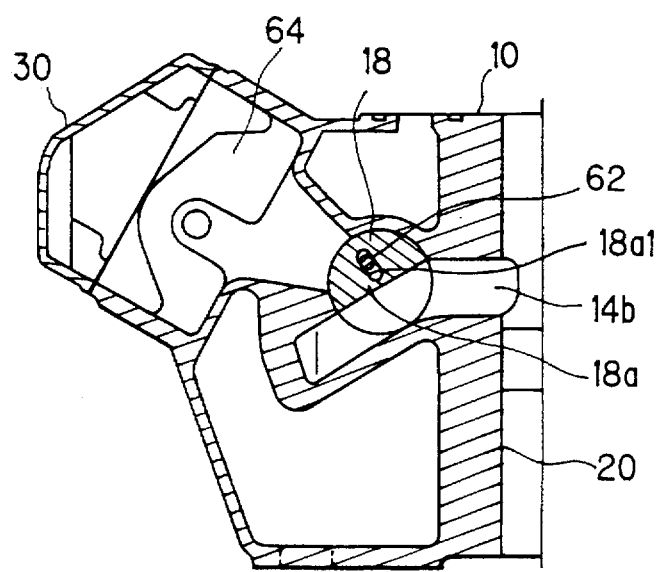

When the engine enters a high-speed rotation period from the low-speed rotation period, the centrifugal governor 42 is actuated to rotate the valve shaft 48, so that the slide valve 16 is raised by the valve arm 50 as shown in FIG. 6A and FIG. 6B. As a result, the upper edge position of the main exhaust port 14a1 is raised to thereby hasten the exhaust timing. On the other hand, as the slide valve 16 is actuated, the right and left side valves 18 are associated with the slide valve 16 through the coupling pin 62 and the slot 18a1 to thereby cause the auxiliary exhaust passages 14b to communicate and close the resonator chamber 64.

According to the first embodiment operating as described above, since the drive source is directly connected to the slide valve 16, the actuating performance of the slide valve 16 is enhanced as compared with the arrangement which actuates a slide valve through side valves. Further, since the right and left side valves 18 are disposed symmetrically in the right to left direction across the slide valve 16, the right and left side valves 18 are well actuated together by receiving substantially the same drive force from the slide valve 16 and do not adversely affect the actuation of the slide valve 16. Furthermore, since the right and left side valves 18 can be formed to the same shape, parts can be machined by the same manner. As a result, common jigs can be used and the kinds of the parts can be reduced.

Since the right and left side valves 18 are coupled with the end of the slide valve 16 on the main exhaust port 14a1 side through the coupling pin 62, the coupling portion is accommodated in the cylinder 10. As a result, the dislocated actuation which would be caused by a gear driving mechanism due to the effect of heat of an exhaust gas does not arise. Further, the above structure is also advantageous to sand, mud and the like.

Since the side valves 18 are supported by the ball bearing 66, they are actuated and since the space between the inner ring 66a and the outer ring 66b of the ball bearing 66 is substantially closed by the side of the valve portion 18a, the leakage of an exhaust gas into the ball bearing 66 can be prevented, by which the insufficient actuation of the side valves 18 caused by the exhaust gas can be eliminated.

Since the side valves 18 are positioned in the axial direction by the end of the coupling pin 62 and the inner ring 66a of the ball bearing 66, there is no possibility that the side valves 18 come into contact with other parts in the axial direction. Thus, the actuating performance can be more enhanced by eliminating the increase of the actuating resistance of the side valves 18 which result from the contact of them with other parts.

Further, since the radial of the ball bearing 66 is set to, for example, about 40 μm or less to minimize the looseness of the side valves 18 caused by the ball bearing 66 in the possible range the falling-down of the side valves 18 due to the cantilevered support thereof is prevented to thereby more reduce the actuating resistance of the side valves 18.

A second embodiment of the exhaust controller for the two-stroke-cycle engine according to the present invention will be described hereunder with reference to FIG. 7 to FIG. 11.

Figure 7A:
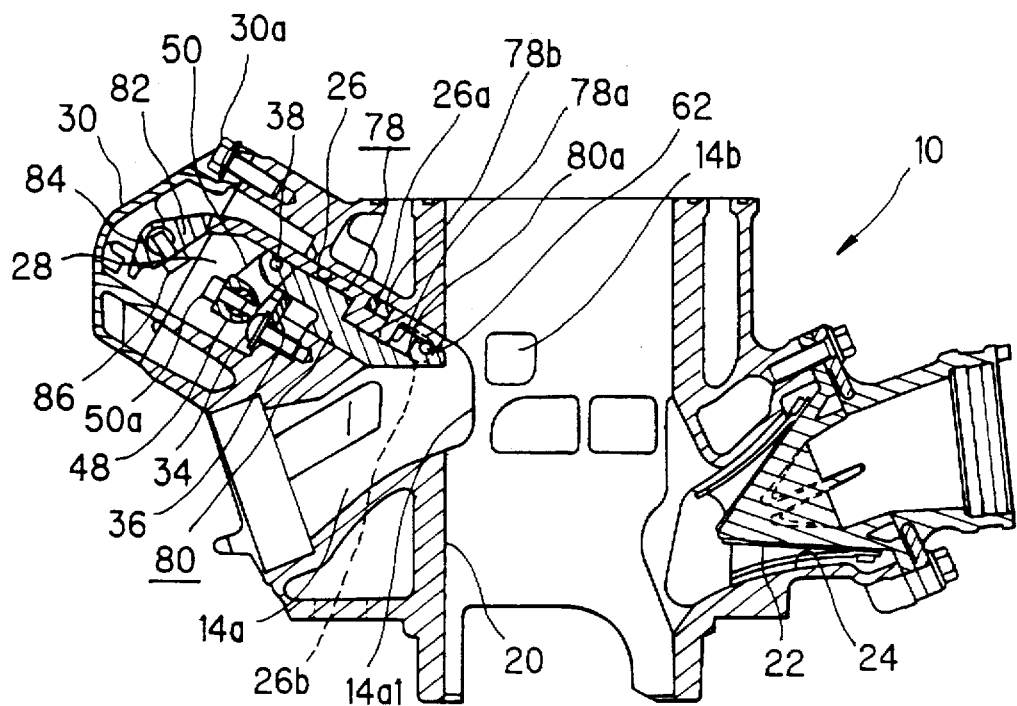

As shown in FIG. 7A, the second embodiment includes two slide valves (corresponding to two main exhaust valves) 78 and 80 piled in a vertical direction to control the upper edge position of the main exhaust port 14a1 in two stages with the lower slide valve 80 being coupled with the valve arm 50 in addition to the basic arrangement of the first embodiment. Further, it is to be noted that the same numerals as used in the first embodiment are used in the second embodiment to denote substantially the arrangements and the description thereof is omitted.

Figure 7B:
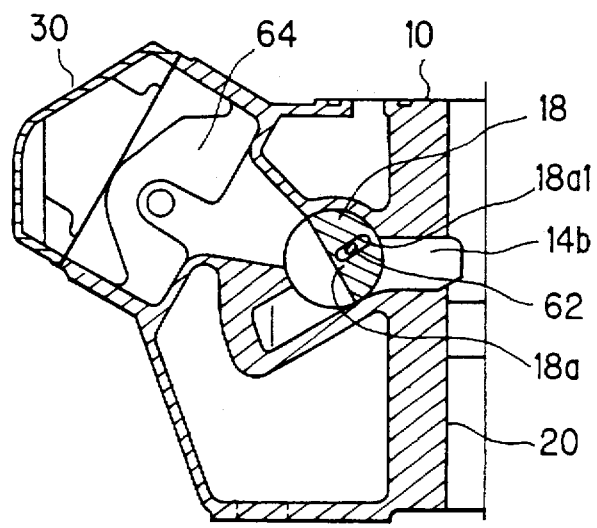

As shown in FIG. 7A and FIG. 7B, the rear portion of the lower slide valve 80 is driven by the valve arm 50 through the drive pin 38 likewise the slide valve 16 of the first embodiment, whereas the front portion thereof is connected to the side valves 18 through the coupling pin 62. A recess 80a opened upward is formed on the upper surface of the lower slide valve 80.

Figure 8:
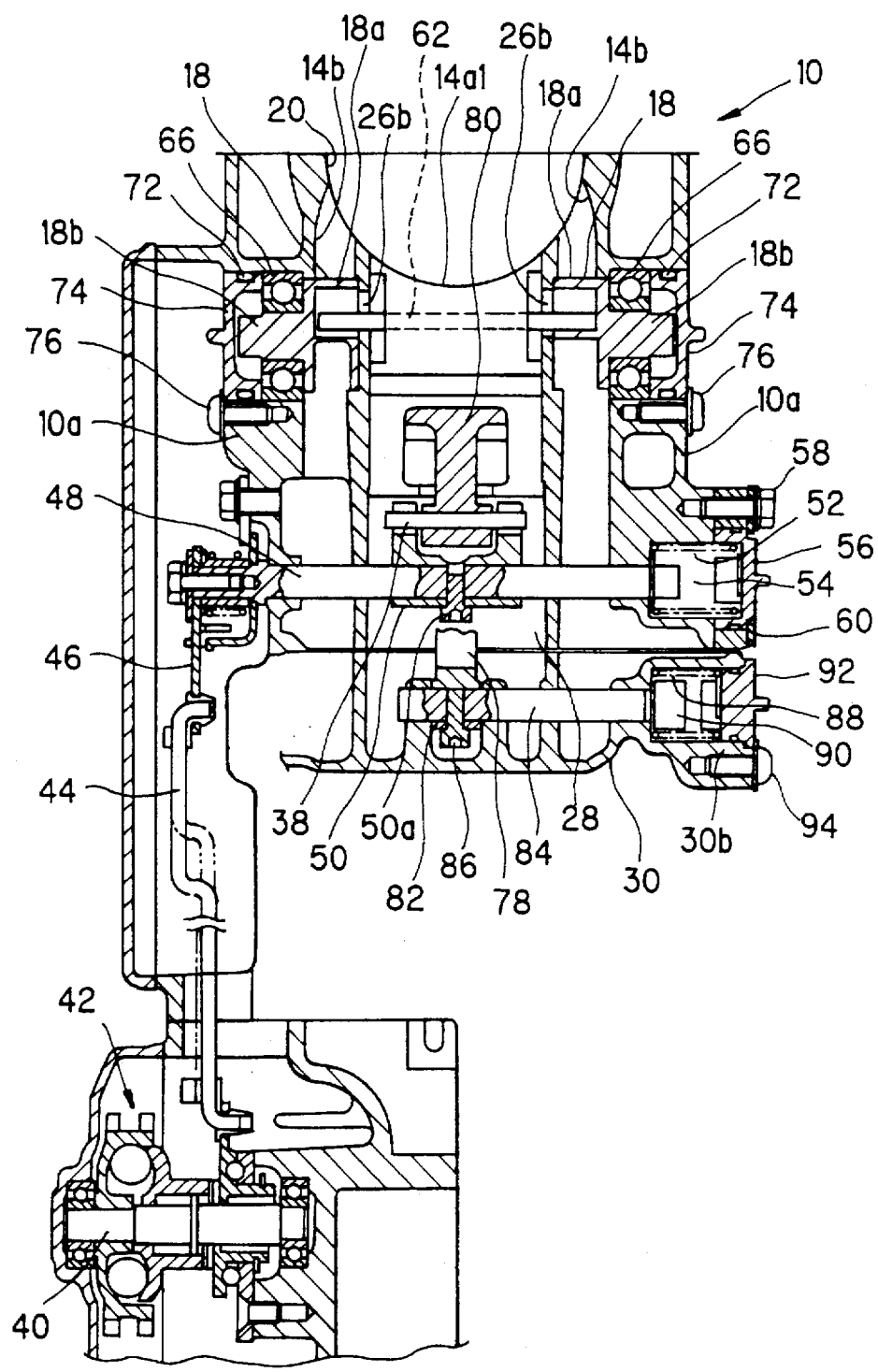
FIG. 8 is a cross sectional view schematically showing the exhaust controller of the second embodiment as a whole.
Figure 9:
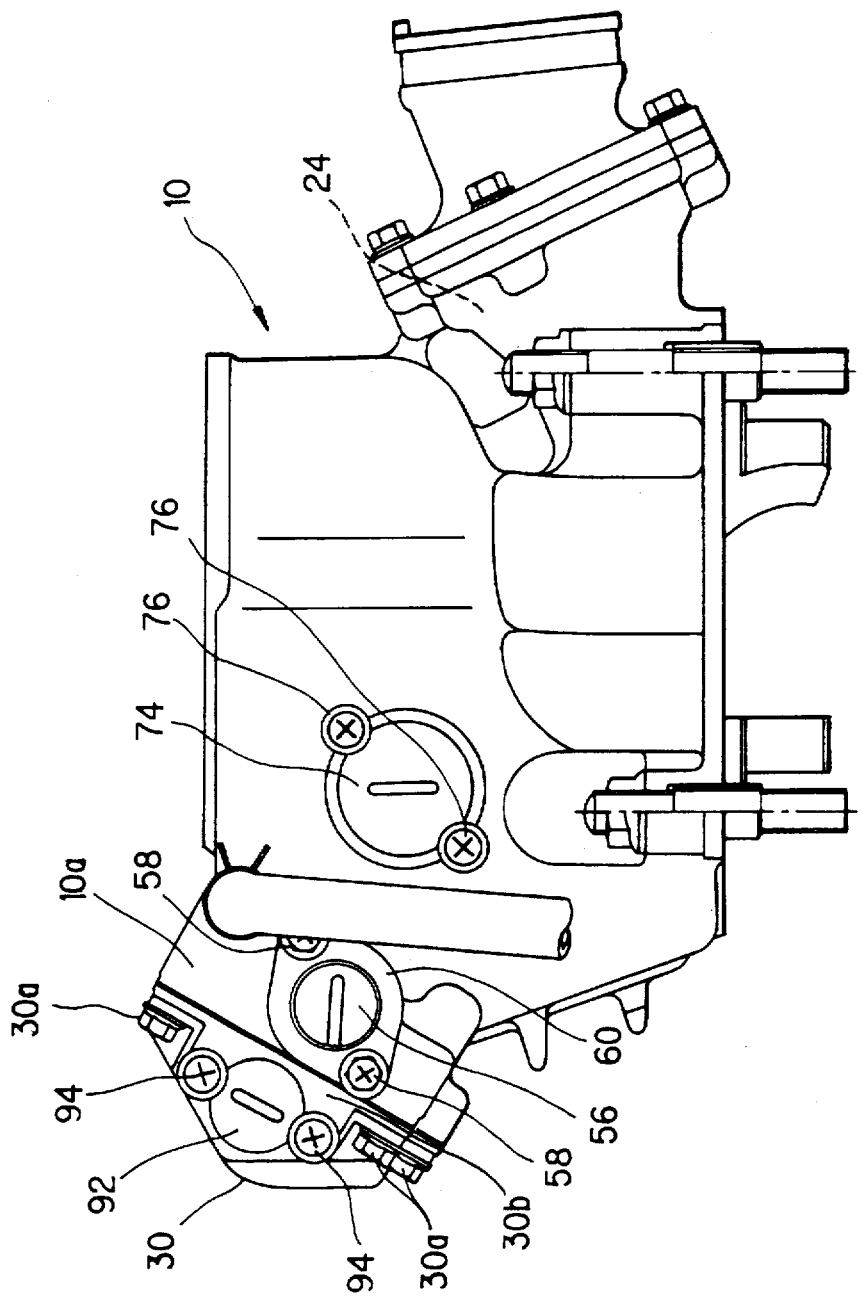
FIG. 9 is a side elevational view of a cylinder according to the second embodiment.

The upper slide valve 78 is formed to be thinner than the lower slide valve 80 and has an engaging projection 78a formed on the lower surface thereof which is engageable with the recess 80a. The upper slide valve 78 has a recess 78b formed on the upper surface thereof which can abut against a stopper 26a projecting from the inner surface of the valve hole 26. Further, the rear end of the upper slide valve 78 extends up to the rear portion of the machine chamber 28, and the front surface of a press arm 82, which presses and urges the upper slide valve 78 in a projecting direction, is in contact with the rear end of the upper slide valve 78. As shown in FIG. 8, the press arm 82 is fixed to a valve shaft 84 rotatably supported by the cover 30 by a bolt 86 and the axial end of the valve shaft 84 on a side extends up to the side wall portion 30b of one side of the cover 30.

To the side wall portion 30b (corresponding to the wall portion of a cylinder constituting part) 30b of the cover 30, there are disposed a spring chamber 90 for accommodating a control spring 88 for urging the upper slide valve 78 in the projecting direction and an operation cap (corresponding to an operating member) 92 which can adjust the load of the control spring 88. Although these control spring 88, spring chamber 90 and operation cap 92 attain the same functions as those of the control spring 52 and the like described in the above first embodiment, the operating cap 92 in this structure is fastened by a screw 94 which is threaded with the side wall portion 30b of the cover 30 after the load of the control spring 88 is set.

Furthermore, in the second embodiment, the ball bearing 66 is fixed to the outer peripheries of the shaft portions of the side valves 18 by force-fit or the like manner without using any bolt and retainer.

The exhaust controller of the second embodiment arranged as described above operates as follows.

First, in an engine low-speed rotation period, both the upper and lower slide valves 78, 80 are projected into the main exhaust passage 14a by the respective urging forces of the two upper and lower control springs 52 and 88 as shown in FIG. 7A and FIG. 7B. Therefore, the upper edge position of the main exhaust port 14a1 is at the extreme end edge of the lower slide valve 80. Thus, an exhaust timing is most delayed. In addition, the side valves 18 open the resonator chamber 64 and shut off the auxiliary exhaust passages 14b.

Figure 10A:
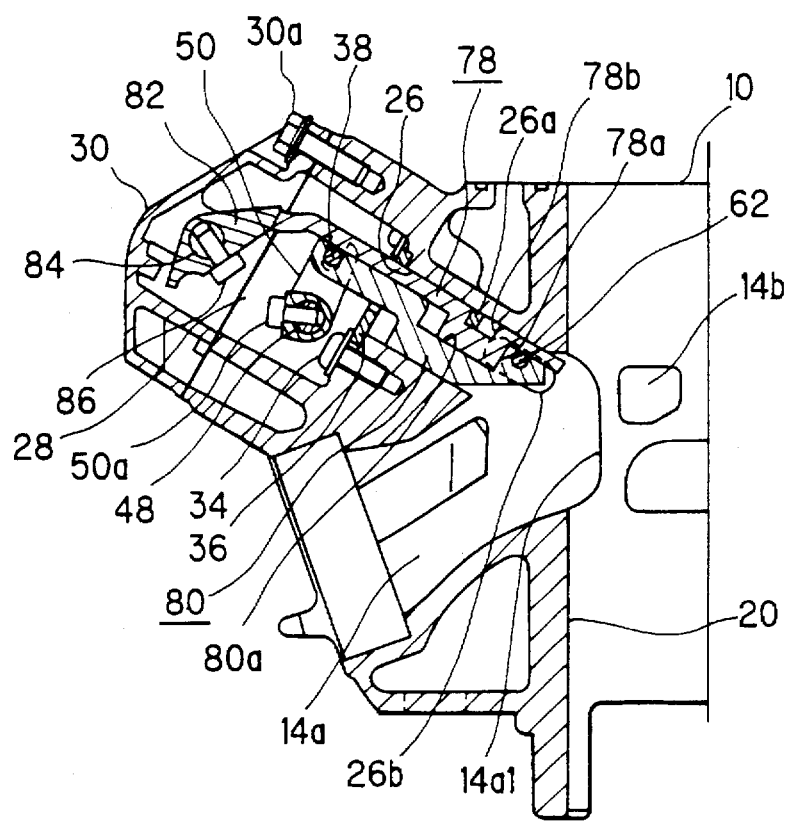
Figure 10B:
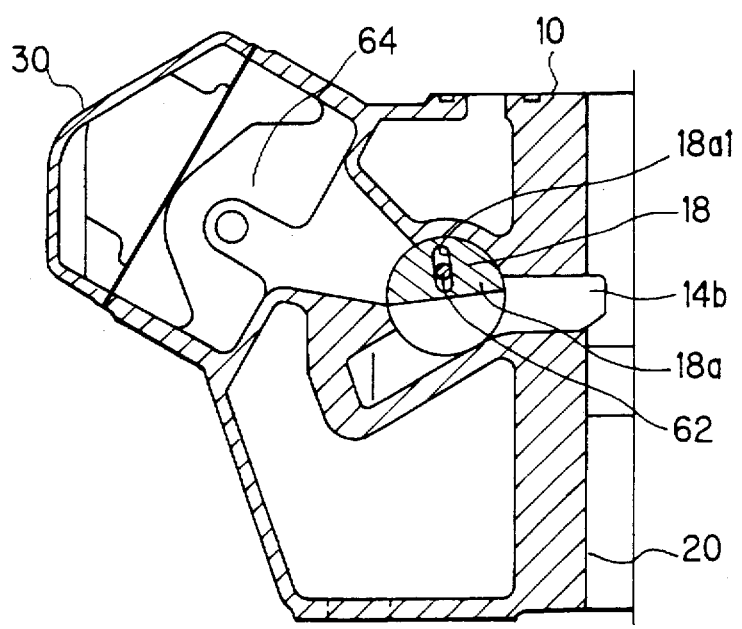

When the engine enters an engine intermediate-speed rotation period from the above state, the centrifugal governor 42 is actuated and the valve shaft 48 is first rotated against the urging force of the control spring 52 for the lower slide valve 80, so that only the lower slide valve 80 is raised by the valve arm 50 as shown in FIG. 10A and FIG. 10B. With this operation, the upper edge position of the main exhaust port 14a1 is slightly raised to hasten the exhaust timing. On the other hand, as the slide valve 80 is actuated, the right and left side valves 18 are associated with the slide valve 80 through the coupling pin 62 and the slot 18a1 to permit the auxiliary exhaust passages 14b to partially communicate and substantially shut off the auxiliary exhaust passages 14b.

Figure 11A:
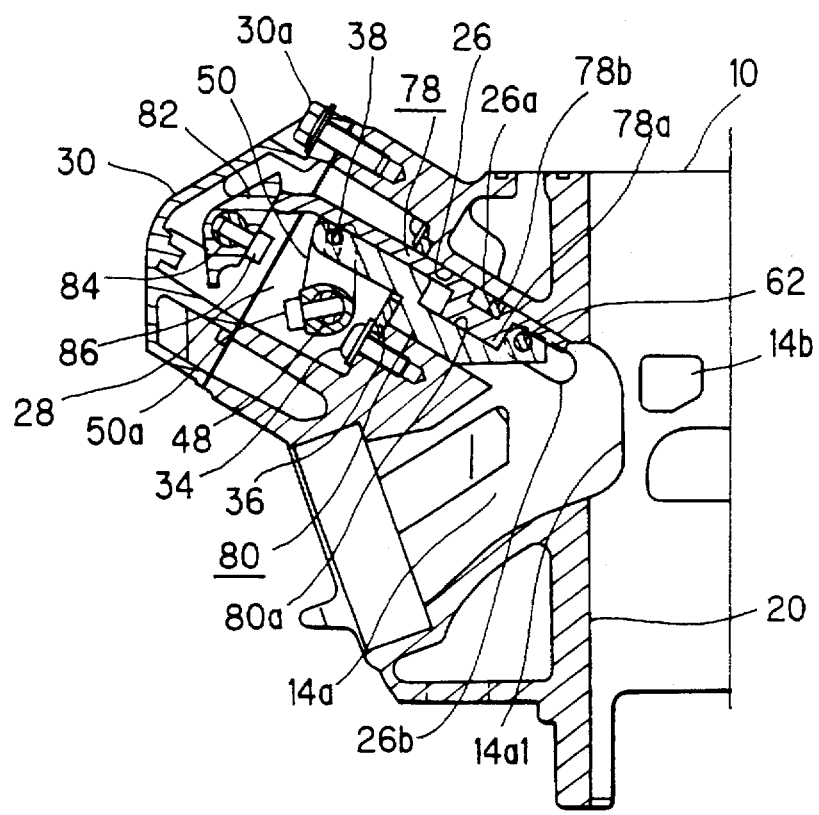
Figure 11B:
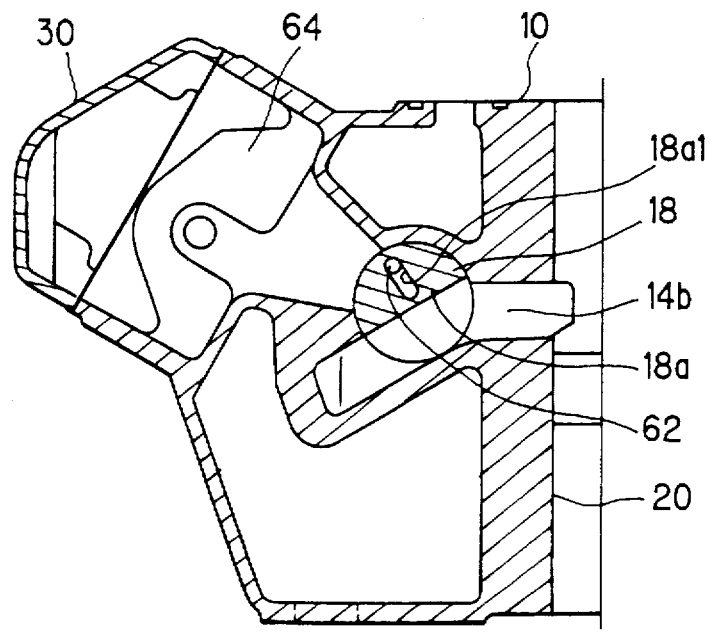
Figure 12A:
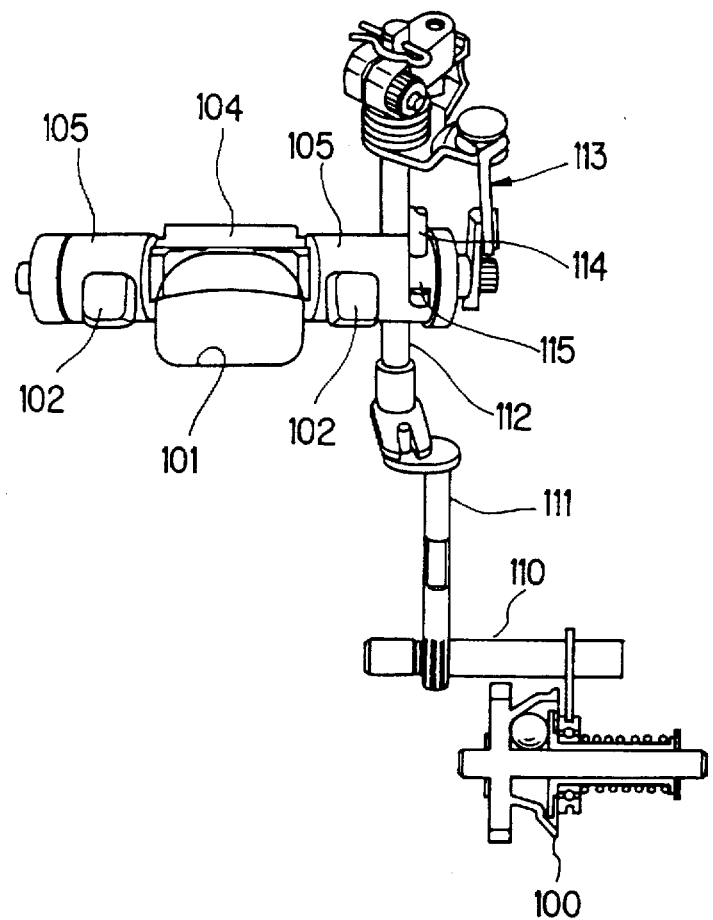
Figure 12B:
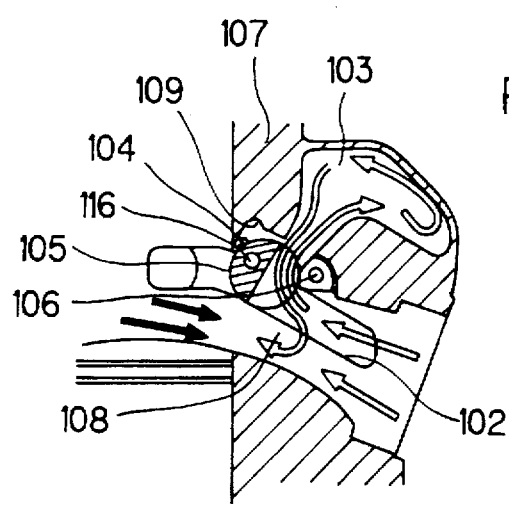
Figure 13A:
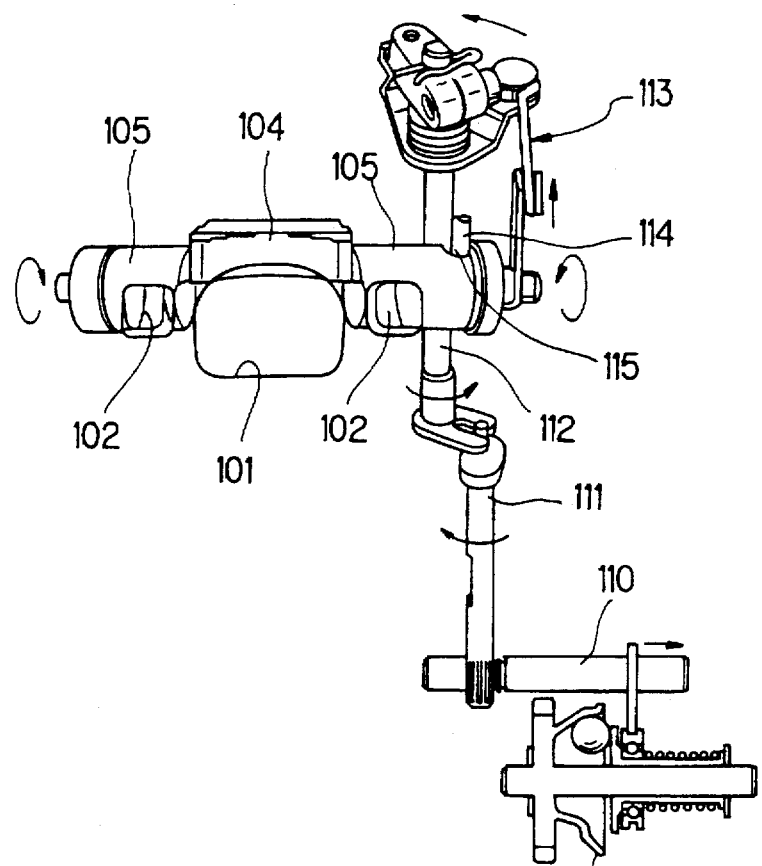
Figure 13B:
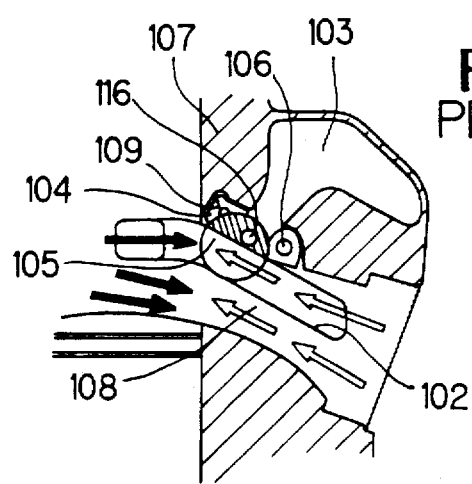
Figure 14:
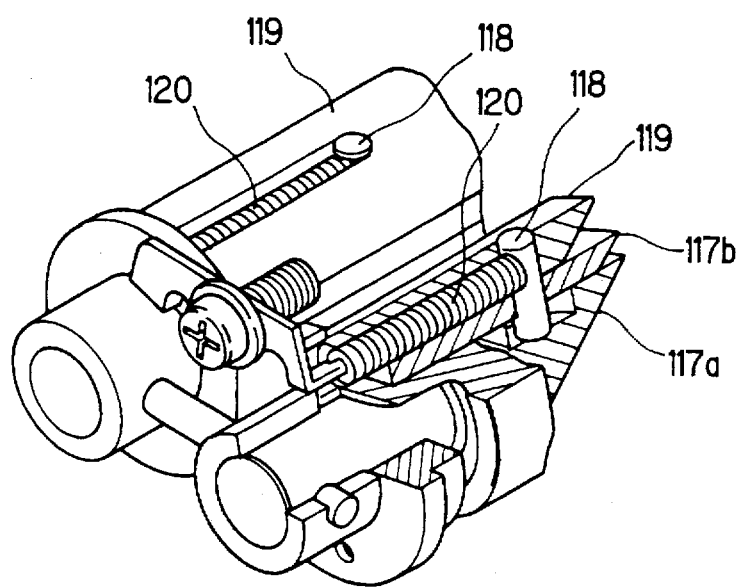
FIG. 14 is a perspective view showing a second example of the conventional exhaust controller.

When the engine enters an engine high-speed rotation period, the centrifugal governor 42 is further actuated and the valve shaft 48 is rotated also against the urging force of the control spring 88 for the upper slide valve 78, so that the lower slide valve 80 is further raised as shown in FIG. 11A and FIG. 11B. At this time, since the front surface of the recess 80a of the lower slide valve 80 abuts against the front surface of the engaging projection 78a of the upper slide valve 78, the upper slide valve 78 also moves together with the lower slide valve 80 until the front surface of the recess 78b abuts against the front surface of the stopper 26a. Therefore, the upper edge position of the main exhaust port 14a1 is most raised so that the exhaust timing is most hastened. On the other hand, the right and left side valves 18 are further rotated by the operation of the slide valve 80 to thereby cause the main exhaust passage 14a to completely communicate and shut off the resonator chamber 64.

In the second embodiment operating as described above, since the control spring 88, which relates to the switching point of the exhaust timing from the engine intermediate-speed rotation period to the engine low-speed rotation period, is incorporated in the side wall portion 30b of the cover 30, no load change is caused by an exhaust gas, and the load set to the control spring 88 can be stably maintained. Further, since the load of the control spring 88 can be easily adjusted by turning the operation cap 92 by loosening the screw 94, the fine adjustment of the control spring 88 can be easily carried out even by ordinary users without decomposing the parts constituting the cylinder.

As described above, according to the present invention, the actuating performance of the main exhaust valve for making an exhaust timing variable and the auxiliary exhaust valves for opening and closing the auxiliary exhaust passages can be enhanced. Exhaust control can be accurately executed by eliminating the dislocated actuation which would be caused by a gear driving mechanism due to the effect of heat of an exhaust gas. The controller can be advantageously arranged against sand, mud and the like. Further, the load set to the control valve relating to the slide valve of the second stage can be stably maintained, and moreover, the fine adjustment of the control valve can be easily carried out from the outside of the engine.

Further, it is to be noted that the present invention is not limited to the described preferred embodiments and many other changes and modifications may be made without departing from scopes of the appended claims.

What is claimed is:

1. An exhaust controller for a two-stroke-cycle engine provided with a main exhaust port and a pair of auxiliary exhaust ports and including a main exhaust valve unit slidably disposed to the main exhaust port for controlling an upper edge position of the main exhaust port and a pair of right and left auxiliary exhaust valve units disposed rotatably for opening and closing right and left auxiliary exhaust passages formed to right and left sides of a main exhaust passage formed to the engine, characterized in that a driving unit is connected to the main exhaust valve unit and the right and left auxiliary exhaust valve units are coupled with an end of the main exhaust valve unit on the main exhaust port side through a coupling pin so as to be operatively associated with the main exhaust valve unit, said right and left auxiliary exhaust valve units being disposed symmetrically with respect to the main exhaust valve unit.

2. An exhaust controller according to claim 1, wherein a valve bore is formed to the engine so that said main exhaust valve unit is disposed to be slidable.

3. An exhaust controller according to claim 2, wherein said main exhaust valve unit has a projected end portion to which is attached a coupling pin to which said driving unit is connected.

4. An exhaust controller according to claim 3, wherein said driving unit is composed of a governor means following up with a rotation of a crank shaft disposed in the engine.

5. An exhaust controller according to claim 1, wherein each of said auxiliary exhaust valve units is disposed in an intermediate portion of a corresponding auxiliary exhaust passage and is composed of substantially a semi-columnar portion and a shaft portion integrally formed with the semi-columnar portion.

6. An exhaust controller according to claim 5, wherein said semi-columnar portion is formed with a slot into which said coupling pin connecting the main exhaust valve unit to the auxiliary exhaust valve units is inserted so as to change a sliding motion of the main exhaust valve unit to a rotational motion of the auxiliary exhaust valve units.

7. An exhaust controller according to claim 1, wherein said main exhaust valve unit includes a pair of upper and lower main exhaust valves piled in a vertical direction for controlling the upper edge position of the main exhaust port in two stages and said driving unit is connected to the lower main exhaust valve and wherein a control spring for controlling an actuation of the upper main exhaust valve is incorporated in a wall portion of an element constituting a cylinder disposed in the engine and an operation member for adjusting a load of said control spring is disposed to an outside of the wall portion.

8. An exhaust controller according to claim 7, wherein said lower main exhaust valve has a rear end operatively connected to a valve arm and a front end operatively connected to the auxiliary exhaust valve units.

\* \* \* \* \*